June 18, 1957 F. W. HOTTENROTH, JR 2,796,076
PRESSURE REGULATOR
Filed Oct. 19, 1953
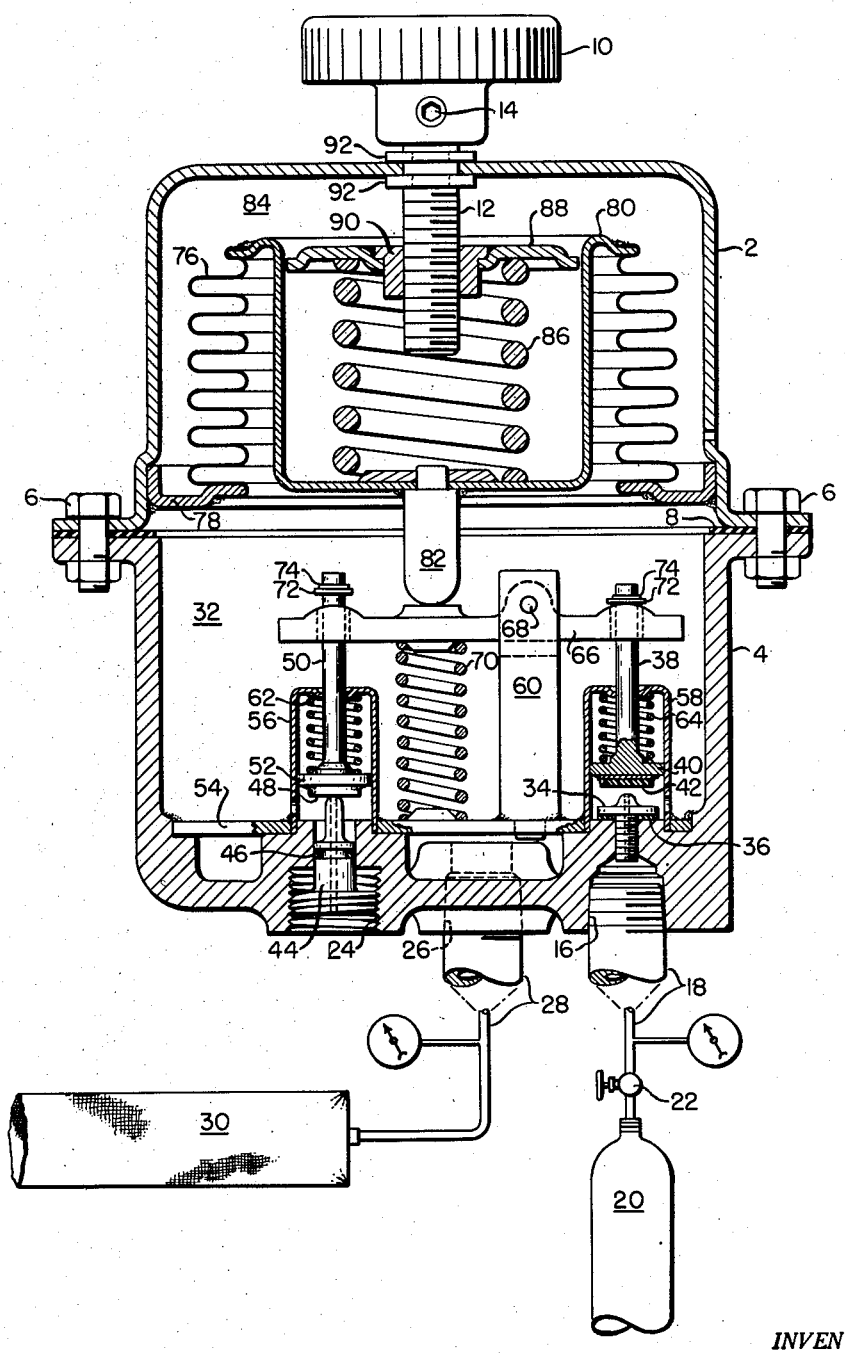
INVENTOR.
FREDERICK W. HOTTENROTH, JR.
BY
ATTORNEYS

United States Patent Office 2,796,076
Patented June 18, 1957

2,796,076

PRESSURE REGULATOR

Frederick W. Hottenroth, Jr., Newton, Mass., assignor to Standard-Thomson Corporation, Boston, Mass., a corporation of Delaware Application October 19, 1953, Serial No. 386,876

4 Claims. (Cl. 137—116.3)

The present invention relates to pressure regulators, and more particularly to apparatus for feeding a gas to a space or chamber to maintain the same at a regulated pressure.

In some devices where a variable pressure lower than that of the available source is desired within a given vessel or space, the procedure is to cause the vessel to bleed the gas continuously at a limited rate. A regulating valve connecting the vessel with the source is caused to feed gas to the vessel at a rate equal to the rate of bleeding to maintain the pressure at the desired level. This method has the disadvantage of requiring a considerable wastage of gas. Furthermore, the gas given off may be objectionable since large amounts thereof may accumulate in the surrounding atmosphere over a period of time. Also, there are considerable difficulties in making adjustments. The regulating valve inlet must necessarily be varied to match source pressure variations, since these will obviously affect the rate of feeding if the inlet opening is held constant.

It is an object of this invention to provide valve means adapted to maintain the pressure at a desired variable level without continuous wastage of the gas during periods in which the vessel pressure remains at the desired level. Such a valve is of particular utility for automatic tourniquets which are often inflated from a limited source of carbon dioxide gas at considerable pressure.

Another object is to provide such a valve which is simple in structure and operation, and which is therefore dependable and unlikely to fail. On the other hand, it is equally necessary to provide accurate variable control of the vessel pressure within close tolerances and over a considerable amplitude of variation.

A further object is to provide an arrangement which functions independently of source pressure variations, thereby permitting the use of smaller volume sources that may vary considerably in pressure with the use of relatively small quantities of gas.

With the above and other objects in view, a feature of the present invention includes an arrangement of two valves connecting the controlled chamber respectively with the atmosphere and with the gas source. The valve plugs are linked with an arm which may be rocked in response to variations in the chamber pressure. Thus, if the chamber pressure is too high, the arm rocks to close the pressure inlet valve and to open the bleeding or exhaust valve. Conversely, if the chamber pressure is too low, the arm rocks in the reverse direction to open the pressure inlet valve and to close the bleeder or exhaust valve.

Another feature of the invention resides in the structure of the valve including a bellows secured within the chamber and evacuated or vented to the atmosphere on one side so as to produce movements of the bellows in response to the chamber pressure, the said movements being utilized to rotate the valve actuating arm.

According to another feature, the valves are so arranged that as the arm rocks from one extreme position to the other, it first begins to close one of the valves while the other valve remains in a closed position due to lack of engagement thereof with the actuating arm. Thereafter, the first-mentioned valve becomes fully closed while the second valve continues to remain closed. Throughout a definite, small "free angle" of rotation of the arm the valves are both fully closed, but as the arm rotates still further the second valve begins to open while the first valve continues to remain closed. External means are provided to adjust the aforesaid angle, which is preferably kept at a small value for reasons more fully developed hereinafter.

Other features include the use of resilient means such as seating springs to cause each valve to be biased closed, whereby it will open only when engaged by the actuating arm.

Still other features of the invention include features of construction, modes of operation, and details of design which will be more fully understood by reference to the following description of a preferred embodiment thereof, and to the claims.

The drawing shows an elevation partly in section illustrating the preferred form of regulator valve connected with a gas pressure bottle and a chamber or vessel to be kept at regulated pressure, the latter being illustrated as a tourniquet.

Referring to the drawing, the illustrated embodiment is intended for use with an automatic tourniquet or for blood pressure indicators. However, after a study thereof it will be apparent that by appropriate adaptation and design the principles of the invention may be used in any application in which it is desired to produce a controlled pressure utilizing a source at higher pressure, and wherein it is desired that variations in the pressure at the source shall not be reflected in the controlled pressure.

The regulator valve is provided with a casing comprising flanged, cup-shaped members 2 and 4 securely bolted together by bolts 6, the connection being rendered gastight by a gasket 8. An adjustment knob 10 secured upon a shaft 12 by a set screw 14 extends from the casing and provides means for adjusting the pressure of the tourniquet, as hereinafter described. The member 4 is fabricated from a casting to provide suitable means for making external pressure connections. A threaded opening 16 is connected by a hose or pipe 18 to a pressure bottle 20 containing a suitable gas such as carbon dioxide. A hand valve 22 may be inserted in the line 18 to provide manual means to shut off the gas supply if desired.

A threaded opening 24 provides a port for the escape or exhaust valve. A threaded opening 26 is connected by a hose or pipe 28 to the tourniquet 30. It is thus apparent that except for momentary or transient conditions, the pressure within the tourniquet 30 will be the same as the pressure within the space 32 inside the regulator valve chamber.

The pressure inlet opening 16 has a threaded portion of reduced diameter to receive a seat member 34 beneath which there is a gasket 36 to prevent leakage of gas into the chamber around the threads. Situated above the valve seat there is a plug member comprising a stem 38 and a portion 40 of enlarged diameter, the portion 40 having a face piece 42 secured thereto. The face piece may be fabricated of any suitable material, such as that known under the trade name "Teflon," which is essentially polymerized tetrafluoroethylene, sprayed with metal on the back to permit soldering to the portion 40.

The exhaust or bleeder opening 24 is provided with threads to receive a seat member 44. The member 44 has an annular groove to receive an O-ring 46 adapted to bear against a smooth inner portion of the opening of reduced diameter. The O-ring prevents loss of pressure by leakage of gas around the sides of the seat member and around the threads in the opening. A slot is provided in the external face of the member 44 so that it may be adjusted upward or downward by a screw driver or the like, thereby raising or lowering the seat of the exhaust valve. This adjustment is made according to certain requirements hereinafter more fully explained in connection with the operation of the device. Co-operating with this seat there is a face piece 48 secured by soldering to a plug member comprising a stem 50 and an enlarged lower portion 52 similar to the corresponding parts of the pressure inlet valve.

A suitably shaped plate 54 having several holes is received into the lower portion 4 of the valve body so as to extend across a portion thereof without sealing any portion of the chamber from the space 32. Prior to assembly into the valve body, this plate forms the support for a subassembly including a pair of cups 56 and 58 and a pedestal 60. These cups, when assembled with the plate into the valve body, surround the pressure inlet and bleeder valves, providing guide surfaces for the enlarged portions 40 and 52 of the valve plugs as well as fixed upper abutments for a pair of springs 62, 64, whereby the valves are both normally biased closed.

The pedestal 60 is provided with a transverse end slot to receive an actuator arm 66, the arm being pivotally supported in the pedestal by a pin 68. A spring 70, normally in compression, bears at one end against the plate 54 and at the other end against the arm 66, thereby tending to rotate the arm in a clockwise direction. This force is opposed by the pressure control elements as hereinafter described.

Each of the valve stems 38, 50 extends through a slot in the arm 66, these slots being of substantially greater size than the stems so that the longitudinal axes of the latter may remain constantly vertical despite rotation of the arm. After the stems are received through the slots in the arm, they are each provided with a washer 72 and a lock ring 74, the latter being fitted into an annular groove in the stem, whereby the valve plugs may be lifted from their seats by suitable rotation of the arm 66.

The seat 44 of the bleeder valve is adjusted in height to a suitable position as illustrated in the figure, whereby upon slight rotation of the arm 66 clockwise from the position shown, the face piece 42 will come to rest upon the seat 34 of the pressure inlet valve prior to the engagement of the arm with the washer 72 of the stem 50. Only after a definite, small, further amount of rotation, referred to as the "free angle," will the stem 50 become engaged, during which time both of the valves are closed. The variation in the pressure in the space 32 necessary to cause this amount of rotation is preferably kept at a small value since it represents the increase in the tourniquet pressure that can be effected independently of the source, as by gas pressure variation through change in temperature, without causing the bleeder valve to open to atmosphere. Thus, at periods during which the pressure within the tourniquet is such that the arm 66 is within the "free angle," there is no connection between the space 32 in the valve and either the source 20 or the atmosphere.

The pressure sensitive control element within the regulator is constructed of a metallic bellows 76. The bellows is preferably soldered at its lower end to an annular ring 78 which is in turn soldered to the member 2. A cup-shaped member 80 is received through the other end of the bellows and soldered thereto at its flanged open end. A short pin 82 is secured with a gastight fit in a hole in the base of the member 80, and in position to bear against the arm 66. Thus, the inside of the bellows is in communication with the main space 32 of the valve, while the outside, which is in communication with a space 84, is sealed therefrom. The space 84 may be evacuated, in which case the bellows responds to the absolute pressure within the regulator, or it may be provided with openings to atmosphere as shown, whereby the regulator responds to the differential between the tourniquet pressure and atmospheric pressure.

A spring 86, normally in compression, bears against the base of the member 80 at one end and against an annular piece 88 at the other end. The piece 88 is secured to a threaded sleeve 90 which can be moved up or down by rotation of the shaft 12. The shaft has a pair of annular grooves spaced immediately above and below the upper wall of the member 2, and each of these grooves receives a split locking ring 92 to retain the shaft 12 in constant axial position.

The operation of the device is as follows. Assuming that the tourniquet is initially at atmospheric pressure, the knob 10 is first turned to a position corresponding to the desired pressure, thus causing the spring 86 to bear upon the member 80 and further causing the arm 66 to be rotated in a counter-clockwise direction, whereby the valve parts will reach a position such as that shown in the figure. In this position, the exhaust or bleeder valve is closed and the pressure inlet valve is open.

The valve 22 is then opened and the gas enters the space 32 of the regulator. Since the tourniquet is in continuous communication with the space 32, gas also enters the tourniquet through the opening 26 in the said space.

As the pressure in the space 32 increases, the bellows is extended and the pressure of the pin 82 upon the arm 66 reduced, thereby allowing the arm to rotate in the clockwise direction.

When the pressure reaches the desired level, the valve plug 42 becomes seated upon the seat 34, thereby shutting off the supply of gas. As previously explained, the bleeder valve is closed at this moment and continues to remain closed upon the occurrence of any change of conditions causing the arm 66 to rotate beyond this position, provided such rotation does not exceed a definite but small "free angle" determined by the adjustment of the valve seat member 44. If continued rotation of the arm should exceed this angle, the arm engages with the washer 72 of the valve stem 50. Thus, the regulator functions to seal the tourniquet at any pressures within this limited range.

The arm 66 may rotate beyond the position in which the pressure inlet valve becomes closed for one or a combination of reasons. For example, there may be a further increase in the pressure in the space 32 induced either by an increase in the temperature of the gas therein or within the tourniquet or the connecting lines, or by a reduction of the volume of the tourniquet. Such further rotation of the arm 66 may also be caused independently of the foregoing factors by readjustment of the knob 10, as further explained below.

In this connection, a useful feature of the regulator resides in its response to changes in the temperature of the gas to maintain the pressure for which it is regulated independent of said changes. When a tourniquet is originally applied, the gas within it will ordinarily be colder than body temperature. As the tourniquet warms up due to body heat, the pressure increases, and in the absence of some provision to relieve it, there may be considerable resultant discomfort and excessive constriction of the body member. Such relief is afforded by the described regulator, however, since the increase in tourniquet pressure causes clockwise rotation of the arm 66, and if this rotation continues until the arm engages the bleeder valve the latter will become lifted to provide an exhaust to atmosphere. Thus, the maximum increase in tourniquet pressure that may occur through the change in temperature is represented by the aforementioned "free angle," and is adjustable by means of the seat member 44.

To reduce the pressure in the tourniquet to atmospheric or to any desired value below that for which the original adjustment was made, the knob 10 is turned to the required position. This decreases the compression of the spring 86 and tends to allow the spring 70 to rotate the arm 66 in a clockwise direction. If this rotation is sufficient, the stem 50 becomes engaged by the arm and the face piece 48 is lifted to allow the escape of gas to atmosphere. This continues until the pressure within the bellows has been reduced to the point where the initial change in the compression of the spring 86 induced by turning the knob 10 has been offset, thereby allowing the arm 66 to rotate counterclockwise through a sufficient angle to allow the bleeder valve to become seated.

Many variations in the specific details of construction, mode of operation and arrangement of the parts herein described will suggest themselves to those skilled in this art in connection with the application of the principles of this invention to various specific needs. Although the invention has been described with reference to a particular embodiment, it is understood and believed that these variations may be effected without departing from the spirit or scope of this invention.

Having thus described the invention, I claim:

1. Apparatus for maintaining a gas in a chamber at regulated superatmospheric pressure, the gas being fed from a source at higher pressure, comprising an arm pivotally supported within the chamber and restricted to rotate about a single fixed pivot, a pair of valve stems each restricted to rectilinear motion, the valve stems being received through the arm on opposite sides of the pivot and having end portions adapted to engage with the arm and to be lifted upon rotation thereof, the chamber having a pair of valve ports connected respectively to the source and atmosphere and the stems supporting valve plugs in position to close the ports, and an adjustable member sensitive to pressure within the chamber having a portion engageable with the arm to cause rotation thereof in response to a change in the chamber pressure.

2. A pressure control valve comprising a casing defining a chamber and having inlet and relief connections thereto, valve seats for said connections secured to the casing within the chamber, a valve for each seat independently supported and substantially restricted to axial movement in relation thereto, each valve having independent resilient means urging it to close and a stem provided with an abutment, an arm restricted to rotate about a single fixed pivot within the chamber, said arm being adapted to fit loosely about said stems and to engage said abutments when rotated, and an adjustable member sensitive to pressure within the chamber having a portion engageable with the arm to cause rotation thereof in response to a change in the chamber pressure.

3. A pressure control valve comprising a casing defining a chamber and having inlet and relief connections thereto, valve seats for said connections secured to the casing within the chamber, a valve for each seat independently supported and substantially restricted to axial movement in relation thereto, each valve having independent resilient means urging it to close and a stem provided with an abutment, an arm restricted to rotate about a single fixed pivot within the chamber, said arm being adapted to fit loosely about said stems and to engage said abutments when rotated, and an adjustable member sensitive to pressure within the chamber having a portion engageable with the arm to cause rotation thereof in response to a change in the chamber pressure, said abutments being arranged with reference to the arm to permit the latter to rotate through a predetermined angle while said valves are both fully seated.

4. A pressure control valve comprising a casing defining a chamber and having inlet and relief connections thereto, valve seats for said connections secured to the casing within the chamber, a valve for each seat independently supported and substantially restricted to axial movement in relation thereto, each valve having independent resilient means urging it to close and a stem provided with an abutment, an arm restricted to rotate about a single fixed pivot within the chamber, said arm being adapted to fit loosely about said stems and to engage said abutments when rotated, a metallic bellows having a closed end and an end sealed to the inner chamber wall to form a space separate from said chamber, said closed end having a portion to engage said arm, and an adjustable spring within said space urging said portion in the direction opposing that induced by an increase in the chamber pressure.

References Cited in the file of this patent

UNITED STATES PATENTS

| 1,145,601 | Lemoine | July 6, 1915 |
| 1,961,550 | Carson | June 5, 1934 |